US010829603B2

(12) United States Patent
Nomura et al.

(10) Patent No.: US 10,829,603 B2
(45) Date of Patent: Nov. 10, 2020

(54) EPOXY RESIN COMPOSITION, RESIN CURED PRODUCT, FIBER-REINFORCED COMPOSITE MATERIAL, AND PREPREG

(71) Applicant: TORAY Industries, Inc., Tokyo (JP)

(72) Inventors: Keiichiro Nomura, Nagoya (JP); Nobuhiro Morioka, Nagoya (JP); Kentaro Sano, Ehime (JP); Noriyuki Hirano, Ehime (JP); Sadayuki Kobayashi, Nagoya (JP)

(73) Assignee: TORAY INDUSTRIES, INC., Tokyo (JP)

( * ) Notice: Subject to any disclaimer, the term of this patent is extended or adjusted under 35 U.S.C. 154(b) by 13 days.

(21) Appl. No.: 15/110,168

(22) PCT Filed: Feb. 17, 2015

(86) PCT No.: PCT/JP2015/054255
§ 371 (c)(1),
(2) Date: Jul. 7, 2016

(87) PCT Pub. No.: WO2015/129513
PCT Pub. Date: Sep. 3, 2015

(65) Prior Publication Data
US 2016/0340485 A1 Nov. 24, 2016

(30) Foreign Application Priority Data

Feb. 25, 2014 (JP) .................................. 2014-033702
Oct. 14, 2014 (JP) .................................. 2014-209704

(51) Int. Cl.
| *C08J 5/24* | (2006.01) |
| *C08G 83/00* | (2006.01) |
| *C08J 5/04* | (2006.01) |
| *C08L 63/00* | (2006.01) |
| *C08L 5/16* | (2006.01) |

(52) U.S. Cl.
CPC .............. *C08J 5/24* (2013.01); *C08G 83/007* (2013.01); *C08J 5/042* (2013.01); *C08L 63/00* (2013.01); *C08J 2363/00* (2013.01); *C08J 2400/21* (2013.01); *C08J 2405/16* (2013.01); *C08L 2205/03* (2013.01)

(58) Field of Classification Search
None
See application file for complete search history.

(56) References Cited

U.S. PATENT DOCUMENTS

| 2006/0068613 | A1* | 3/2006 | Tsukada | ................ | H05K 1/028 |
| | | | | | 439/67 |
| 2007/0077391 | A1* | 4/2007 | Okamoto | ................ | B32B 3/02 |
| | | | | | 428/116 |
| 2009/0032286 | A1* | 2/2009 | Urakawa | ............... | C08G 18/003 |
| | | | | | 174/250 |
| 2012/0316278 | A1 | 12/2012 | Inoue et al. | | |
| 2013/0319735 | A1* | 12/2013 | Inoue | ..................... | H05K 1/036 |
| | | | | | 174/255 |
| 2015/0373838 | A1 | 12/2015 | Sawada et al. | | |
| 2016/0122605 | A1* | 5/2016 | Hayashi | ............... | C09D 167/04 |
| | | | | | 525/54.3 |
| 2016/0264813 | A1* | 9/2016 | Sawada | ................ | C09D 105/16 |

FOREIGN PATENT DOCUMENTS

| EP | 3006480 A1 | 4/2016 |
| JP | 2006-316089 A | 11/2006 |
| JP | 2007-92024 A | 4/2007 |
| JP | 2013-124298 A | 6/2013 |
| JP | 2013-209460 A | 6/2013 |
| JP | 2013124298 A * | 6/2013 |
| JP | 2014-37477 A | 2/2014 |
| JP | 2014/196636 A1 | 12/2014 |
| WO | WO 2015/052853 A1 | 4/2015 |
| WO | WO 2015/052931 A1 | 4/2015 |

OTHER PUBLICATIONS

Advanced SoftMaterials Inc., "SeRM Super Polymer User's Guide," version Sep. 7, 2011.*
Li et al., "Highly toughened polylactide with novel sliding graft copolymer by in situ reactive compatibilization, crosslinking and chain extension," Elsevier, Polymer, vol. 55, 2014 (Available online Jun. 24, 2014), pp. 4313-4323.
International Search Report for PCT/JP2015/054255 (PCT/ISA/210) dated Mar. 17, 2015.
Written Opinion of the International Searching Authority for PCT/JP2015/054255 (PCT/ISA/237)dated Mar. 17, 2015.
Extended European Search Report, dated Aug. 2, 2017, for European Application No. 15755285.2.

* cited by examiner

*Primary Examiner* — Rachel Kahn
*Assistant Examiner* — Ha S Nguyen
(74) *Attorney, Agent, or Firm* — Birch, Stewart, Kolasch & Birch, LLP

(57) ABSTRACT

There is provided a cured product of an epoxy resin composition, in which the compounding composition and the phase-separated structure of the epoxy resin composition are controlled so that the balance between rigidity and toughness of the cured product is superior compared with those of cured products of conventional epoxy resin compositions. A cured product of an epoxy resin composition, which has both superior rigidity and superior toughness compared with conventional materials can be produced by curing an epoxy resin composition comprising an epoxy resin, a polyrotaxane having graft-chain-modified cyclic molecules and a curing agent for the epoxy resin.

8 Claims, No Drawings

EPOXY RESIN COMPOSITION, RESIN CURED PRODUCT, FIBER-REINFORCED COMPOSITE MATERIAL, AND PREPREG

TECHNICAL FIELD

The present invention relates to an epoxy resin composition containing a polyrotaxane, and a prepreg and fiber-reinforced composite material each produced using the epoxy resin composition.

BACKGROUND ART

Fiber-reinforced composite materials produced using carbon fibers, aramid fibers and the like as reinforcing fibers have been widely used as structural materials for air planes, automobiles and the like, materials for sporting applications including tennis rackets, golf shafts and fishing rods and for general industrial applications and the like, by taking advantage of their high specific strength and specific elastic moduli. As the method for producing the fiber-reinforced composite materials, a method in which prepregs that are sheet-like intermediate materials each composed of reinforcing fibers impregnated with a matrix resin are used and multiple plies of the prepregs are laminated together and then cured has been often employed. The method utilizing prepregs has such an advantage that a fiber-reinforced composite material having high performance can be produced easily, because the orientation, arrangement and compounding amount of reinforcing fibers can be controlled precisely and the degree of flexibility in the designing of a laminated structure is high. As the matrix resin to be used in prepregs, thermosetting resin compositions are predominantly used from the viewpoint of heat resistance and production efficiency, and epoxy resin compositions are particularly preferably used from the viewpoint of the bonding to reinforcing fibers and the like.

A matrix resin made from an epoxy resin exhibits excellent heat resistance and good mechanical properties. However, the elongation and toughness of the epoxy resin are poorer compared with those of thermoplastic resins and, when used in the production of a fiber-reinforced composite material, the impact resistance of the fiber-reinforced composite material becomes poor. Therefore, the improvement has been required for the epoxy resin.

As the method for improving the toughness of a resin cured product produced by curing an epoxy resin composition, a method in which a rubber component or a thermoplastic resin, which has excellent toughness, is compounded is known. However, rubber has a low elastic modulus and a low glass transition temperature and therefore decreases the elastic modulus of the resultant resin cured product. Therefore, it is difficult to achieve a good balance between toughness and rigidity of the resin cured product by compounding a rubber component. On the other hand, as a technique for compounding a thermoplastic resin, a method in which a styrene-butadiene-methyl methacrylate copolymer, a block copolymer such as a butadiene-methyl methacrylate block copolymer or the like is added to greatly improve the toughness of the resultant resin cured product has been proposed (Patent Documents 1 and 2). In Patent Document 3, a technique in which a (meth) acrylic block copolymer is alloyed with an epoxy resin has been proposed.

As the method for improving the balance between toughness and rigidity of an epoxy resin cured product, an epoxy resin composition is disclosed which is produced by combining a diglycidyl ether-type epoxy compound having a specific number average molecular weight with an epoxy compound having a solubility parameter (an SP value) that is different from that of the aforementioned epoxy compound in a specific range (Patent Document 4).

As the technique for further improving the balance between toughness and rigidity of an epoxy resin cured product, a technique is known in which an epoxy resin composition containing an epoxy compound having a specific SP value is used and a phase-separated structure is formed after the curing reaction of the epoxy resin composition (Patent Document 5).

In addition, as the technique for improving the performance of an epoxy resin, a technique is known in which a polyrotaxane is added (Patent Document 6).

PRIOR ART DOCUMENTS

Patent Documents

Patent Document 1: International Publication No. 2006/077153
Patent Document 2: National Publication of International Patent Application No. 2003-535181
Patent Document 3: Japanese Patent Laid-open Publication No. 2010-100834
Patent Document 4: International Publication No. 2009/107697
Patent Document 5: International Publication No. 2012/043453
Patent Document 6: Japanese Patent Laid-open Publication No. 2006-316089

SUMMARY OF THE INVENTION

Problems to be Solved by the Invention

However, the methods disclosed in Patent Documents 1 and 2 have problems of the deterioration of processability caused by thickening and the deterioration of quality caused by the generation of voids or the like. In the method disclosed in Patent Document 3, although a fine phase structure can be formed to achieve excellent toughness, further improvement of the toughness is still required. In the method disclosed in Patent Document 4, the balance between toughness and rigidity of an epoxy resin cured product is insufficient and it is likely that the viscosity of an epoxy resin composition is increased.

The method disclosed in Patent Document 5 is a technique that can achieve excellent toughness and rigidity of an epoxy resin cured product by forming a fine phase-separated structure after curing, and therefore would be a technique of greatly improving the performance of a matrix resin in a fiber-reinforced composite material compared with conventional techniques. However, the method has a problem that the phase-separated structure can vary depending on reaction conditions and therefore the physical properties of the resultant product may be deteriorated.

The technique disclosed in Patent Document 6 is a technique that can improve heat resistance and internal stress- and external stress-relaxing properties by forming a crosslinked structure between a cyclodextrin molecule in a polyrotaxane with an epoxy resin. However, this technique has a problem that the toughness of the epoxy resin is deteriorated.

The present invention addresses the problem of providing: an epoxy resin composition which can be formed into a resin cured product having excellent rigidity and toughness; and a prepreg and a fiber-reinforced composite material each of which is produced using the epoxy resin composition.

Solutions to the Problems

In order to solve the problems, the present invention has the following constitution: an epoxy resin composition comprising an epoxy resin (A), a polyrotaxane (B) having graft-chain-modified cyclic molecules and a curing agent (D) capable of reacting with the epoxy resin (A).

The present invention includes a resin cured product produced by curing the epoxy resin composition.

The present invention includes a fiber-reinforced composite material comprising the resin cured product and reinforcing fibers.

The present invention includes a prepreg comprising the epoxy resin composition and reinforcing fibers.

The present invention includes a fiber-reinforced composite material produced by curing the prepreg.

Effects of the Invention

A resin cured product having both excellent rigidity and excellent toughness can be produced by curing the epoxy resin composition according to the present invention.

EMBODIMENTS OF THE INVENTION

Hereinbelow, the present invention will be described in detail.

The epoxy resin composition according to the present invention is characterized by comprising an epoxy resin (A), a polyrotaxane (B) and a curing agent (D) capable of reacting with the epoxy resin (A).

The epoxy resin (A) is a component required for exerting heat resistance and mechanical properties. Specific preferred examples of the epoxy resin (A) include epoxy resins of each of which the precursor is a compound such as a phenol compound, an amine compound, a carboxylic acid or an intramolecular unsaturated carbon compound. These epoxy resins may be added singly, or two or more of them may be used in combination.

Examples of a glycidyl ether-type epoxy resin of which the precursor is a phenol compound include a bisphenol A-type epoxy resin, a bisphenol F-type epoxy resin, a bisphenol S-type epoxy resin, an epoxy resin having a biphenyl structure, a phenol novolac-type epoxy resin, a cresol novolac-type epoxy resin, a resorcinol-type epoxy resin, an epoxy resin having a naphthalene structure, a trisphenylmethane-type epoxy resin, a phenol aralkyl-type epoxy resin, a dicyclopentadiene-type epoxy resin and a diphenylfluorene-type epoxy resin, and various isomers, alkyl-substituted products and halogen-substituted products of these epoxy resins. An epoxy resin produced by modifying an epoxy resin of which the precursor is a phenol compound with urethane or an isocyanate is also included in these types of resins.

Examples of commercially available products of the bisphenol A-type epoxy resin include "Epikote (a registered trademark)" 825, 826, 827, 828, 834, 1001, 1002, 1003, 1004, 1004AF, 1007 and 1009 (manufacture by Mitsubishi Chemical Corporation), "Epikuron (a registered trademark)" 850 (manufactured by DIC Corporation), "EPOTOHTO (a registered trademark)" YD-128 (manufactured by Nippon Steel & Sumikin Chemical Co., Ltd.), and DER-331 and DER-332 (manufactured by The Dow Chemical Company).

Examples of commercially available products of the bisphenol F-type epoxy resin include "Epikote (a registered trademark)" 806, 807, 1750, 4004P, 4007P and 4009P (manufactured by Mitsubishi Chemical Corporation), "Epikuron 830 (a registered trademark)" (manufactured by DIC Corporation), and "EPOTOHTO (a registered trademark)" YD-170, YD-175, YDF2001 and YDF2004 (manufactured by Nippon Steel & Sumikin Chemical Co., Ltd.). An example of a commercially available product of a tetramethylbisphenol F-type epoxy resin which is an alkyl-substituted product is YSLV-80XY (manufactured by Nippon Steel Chemical Co., Ltd.).

An example of the bisphenol S-type epoxy resin is "Epikuron (a registered trademark)" EXA-1515 (manufactured by DIC Corporation).

Examples of commercially available products of the epoxy resin having a biphenyl structure include "Epikote (a registered trademark)" YX4000H, YX4000, YL6616, YL6121H and YL6640 (manufactured by Mitsubishi Chemical Corporation) and NC-3000 (manufactured by Nippon Kayaku Co., Ltd.).

Examples of commercially available products of the phenol novolac-type epoxy resin include "Epikote (a registered trademark)" 152 and 154 (manufactured by Mitsubishi Chemical Corporation), and "Epikuron (a registered trademark)" N-740, N-770 and N-775 (manufactured by DIC Corporation).

Examples of commercially available products of the cresol novolac-type epoxy resin include "Epikuron (a registered trademark)" N-660, N-665, N-670, N-673 and N-695 (manufactured by DIC Corporation), and EOCN-1020, EOCN-102S and EOCN-104S (manufactured by Nippon Kayaku Co., Ltd.).

An example of commercially available products of the resorcinol-type epoxy resin is "DENACOL (a registered trademark)" EX-201 (manufactured by Nagase ChemteX Corporation).

Examples of commercially available products of the epoxy resin having a naphthalene structure include "Epikuron (a registered trademark)" HP4032 (manufactured by DIC Corporation), and NC-7000 and NC-7300 (manufactured by Nippon Kayaku Co., Ltd.).

Examples of commercially available products of the trisphenylmethane-type epoxy resin include TMH-574 (manufactured by Sumitomo Chemical Co., Ltd.) and Tactix742 (manufactured by Huntsman Advanced Materials Corporation).

Examples of commercially available products of the dicyclopentadiene-type epoxy resin include "Epikuron (a registered trademark)" HP7200, HP7200L and HP7200H (manufactured by DIC Corporation), Tactix558 (manufactured by Huntsman Advanced Materials Corporation), and XD-1000-1L and XD-1000-2L (manufactured by Nippon Kayaku Co., Ltd.).

Examples of commercially available products of the urethane- or isocyanate-modified epoxy resin include AER4152 (manufactured by Asahi Kasei Epoxy Co., Ltd.) which has an oxazolidone ring and ACR1348 (manufactured by Asahi Denka Co., Ltd.).

An example of commercially available products of the dimer acid-modified bisphenol A-type epoxy resin is "Epikote (a registered trademark)" 872 (manufactured by Mitsubishi Chemical Corporation).

Examples of the epoxy resin of which the precursor is an amine compound include tetraglycidyl diaminodiphenyl methane, a glycidyl compound of xylenediamine, triglycidyl aminophenol and glycidylaniline, and regioisomers of these epoxy resins and substituted products of these epoxy resins with an alkyl group or a halogen atom.

Examples of commercially available products of tetraglycidyl diaminodiphenyl methane include "SUMI-EPDXY (a registered trademark)" ELM434 (manufactured by Sumitomo Chemical Co., Ltd.), "Araldite (a registered trademark)" MY720, MY721, MY9512, MY9612, MY9634 and MY9663 (manufactured by Huntsman Advanced Materials Corporation), and "Epikote (a registered trademark)" 604 (manufactured by Mitsubishi Chemical Corporation).

An example of commercially available products of the glycidyl compound of xylenediamine is "TETRAD (a registered trademark)"-X (manufactured by Mitsubishi Gas Chemical Company, Inc.).

Examples of commercially available products of triglycidyl aminophenol include "Epikote (a registered trademark)" 630 (manufactured by Mitsubishi Chemical Corporation), "Araldite (a registered trademark)" MY0500, MY0510 and MY0600 (manufactured by Huntsman Advanced Materials Corporation), and ELM100 (manufactured by Sumitomo Chemical Co., Ltd.).

Examples of commercially available products of the glycidylaniline compound include GAN and GOT (manufactured by Nippon Kayaku Co., Ltd.).

Examples of the epoxy resin of which the precursor is a carboxylic acid include a glycidyl compound of phthalic acid and various isomers of a glycidyl compound of a carboxylic acid such as hexahydrophthalic acid and a dimer acid.

Examples of commercially available products of diglycidyl phthalate include "EPOMIK (a registered trademark)" R508 (manufactured by Mitsui Chemicals, Inc.) and "DENACOL (a registered trademark)" EX-721 (manufactured by Nagase ChemteX Corporation).

Examples of commercially available products of diglycidyl hexahydrophthalate include "EPOMIK (a registered trademark)" R540 (manufactured by Mitsui Chemicals, Inc.) and AK-601 (manufactured by Nippon Kayaku Co., Ltd.).

Examples of commercially available products of a dimer acid diglycidyl ester include "Epikote (a registered trademark)" 871 (manufactured by Mitsubishi Chemical Corporation) and "EPOTOHTO (a registered trademark)" YD-171 (manufactured by Nippon Steel & Sumikin Chemical Co., Ltd.).

An example of the epoxy resin of which the precursor is an intramolecular unsaturated carbon is an alicyclic epoxy resin. Examples of commercially available products of this epoxy resin include "Celloxide (a registered trademark)" 2021 and Celloxide (a registered trademark) 2080 (manufactured by Daicel Chemical Industries, Ltd.) and CY183 (manufactured by Huntsman Advanced Materials Corporation).

The amount of the epoxy resin (A) is preferably 50% by mass or more, more preferably 80% by mass or more, still more preferably 90% by mass or more, relative to the whole amount of the epoxy resin composition. When the amount is 50% by mass or more, it becomes possible to exert properties inherent in an epoxy resin cured product, including rigidity and heat resistance, after the curing of the epoxy resin composition.

The epoxy resin composition according to the present invention is characterized by containing a polyrotaxane (B) having graft-chain-modified cyclic molecules. A term "rotaxane" generally refers to a molecule having such a shape that a dumbbell-shaped axle molecule (a linear molecule having bulky block groups respectively at both terminals thereof) which is threaded through a cyclic molecule, and the term "polyrotaxane" refers to a molecule in which one axle molecule is threaded through multiple cyclic molecules.

The polyrotaxane (B) is composed of a linear molecule and at least two cyclic molecules, in which the linear molecule is threaded through openings of the cyclic molecules and the linear molecule has bulky block groups respectively at both terminals thereof so that the cyclic molecules cannot be detached from the linear molecule. The polyrotaxane (B) has such a structure that the cyclic molecules can move freely on the linear molecule but cannot fall out from the linear molecule due to the presence of the block groups. In other words, the polyrotaxane (B) has such a structure that the linear molecule and the cyclic molecules keep their shapes through mechanical bonding, not chemical bonding, therebetween.

The above-mentioned polyrotaxane has an effect of relaxing an externally applied stress or an internally remaining stress due to high motility of the cyclic molecules. Furthermore, it becomes possible to extend the same effect to the epoxy resin by adding the polyrotaxane to the epoxy resin composition.

The linear molecule is not limited particularly, as long as the linear molecule is a polymer having functional groups capable of reacting with the block groups. Preferred examples of the linear molecule include: a polyalkylene glycol such as polyethylene glycol, polypropylene glycol and polytetramethylene glycol; a hydroxy-terminal polyolefin such as polybutadienediol, polyisoprenediol, polyisobutylenediol, poly(acrylonitrile-butadiene)diol, hydrogenated polybutadienediol, polyethylenediol and polypropylenediol; a polyester such as polycaprolactonediol, polylactic acid, polyethylene adipate, polybutylene adipate, polyethylene terephthalate and polybutylene terephthalate; a terminal-functional polysiloxane such as silanol-terminal polydimethylsiloxane; an amino-terminal linear polymer such as amino-terminal polyethylene glycol, amino-terminal polypropylene glycol and amino-terminal polybutadiene; and a polyfunctional linear polymer such as a tri-functional or higher linear polymer having at least three functional groups as mentioned above per molecule. Among these linear molecules, a linear molecule selected from polyethylene glycol and amino-terminal polyethylene glycol is preferably used from the viewpoint of the easiness of the synthesis of the polyrotaxane. The number average molecular weight of the linear molecule is preferably 2,000 to 100,000, more preferably 10,000 to 50,000.

The block group is not limited particularly, as long as the block group can bind to the terminal functional groups in the linear molecule and is enough bulky to prevent the detachment of the cyclic molecules from the linear molecule. Preferred examples of the block group include a dinitrophenyl group, a cyclodextrin group, an adamantane group, a trityl group, a fluorescein group, a pyrene group, an anthracene group, and a main chain or side chain of a polymer having a number average molecular weight of 1,000 to 1,000,000. These block groups may be used singly, or two or more of them may be used in combination.

The cyclic molecule is not limited particularly, as long as the linear molecule can be threaded through an opening of the cyclic molecule. Preferred examples of the cyclic molecule include a cyclodextrin compound, a crown ether, a cryptand compound, a macrocyclic amine, a calixarene and a cyclophane. The cyclodextrin compound is a compound in which multiple glucose molecules are linked together in a cyclic form via an α-1,4-bond. A cyclic molecule selected from α-cyclodextrin, β-cyclodextrin and γ-cyclodextrin is more preferably used.

In the present invention, each of the cyclic molecules contained in the polyrotaxane (B) is characterized by being modified with a graft chain. When each of the cyclic molecules is modified with a graft chain, the compatibility of the polyrotaxane with the epoxy resin, the solubility of the polyrotaxane in an organic solvent and the reactivity of the polyrotaxane become good. The graft chain is preferably a polyester. From the viewpoint of the compatibility with the epoxy resin and the solubility in an organic solvent, the graft chain is more preferably an aliphatic polyester. The aliphatic polyester is preferably a polyester selected from polylactic acid, polyglycolic acid, poly(3-hydroxybutyrate), poly(4-hydroxybutyrate), poly(3-hydroxybutyrate-co-3-hydroxyvalerate) and poly(ε-caprolactone). Among these polyesters, poly(ε-caprolactone) is particularly preferred from the viewpoint of the compatibility with the epoxy resin.

The terminal of the graft chain is preferably a highly reactive group that can react with the epoxy resin and/or a crosslinking agent easily, from the viewpoint of making it possible to easily extend the relaxation effect of the polyrotaxane to the epoxy resin when the polyrotaxane is added to the epoxy resin composition. It is preferred that the terminal of the graft chain has a group selected from an isocyanate group, a thioisocyanate group, an amine group, a glycidyl group, a carboxylic acid group, a sulfonic acid group, an alkoxysilane group and an ammonium salt group.

It is preferred that the epoxy resin composition according to the present invention contains a crosslinking agent (C) capable of reacting with the polyrotaxane. When the crosslinking agent (C) is contained, molecules of the polyrotaxane (B) form a network structure easily in the epoxy resin (A). Therefore, after curing, the rigidity of the resin cured product can be exerted easily. The crosslinking agent (C) is not limited particularly, and it is preferred that the crosslinking agent (C) has a highly reactive group that can react with the epoxy resin and/or the polyrotaxane easily, from the viewpoint of making it possible to easily extend the relaxation effect of the polyrotaxane to the epoxy resin when the polyrotaxane is added to the epoxy resin composition. Preferred examples of the crosslinking agent (C) include a polyisocyanate compound having multiple isocyanate groups per molecule, a block polyisocyanate compound having multiple blocked isocyanate groups per molecule, a polyol compound having multiple hydroxy groups per molecule, and a polycarboxylic acid compound having multiple carboxyl groups per molecule. In addition, a compound produced by reacting a polyisocyanate compound with a polyol compound, and a block polyisocyanate compound produced by protecting the aforementioned reaction product with a blocking agent can also be used. From the viewpoint of the reactivity with the epoxy resin and the easiness of handling, a compound selected from a polyisocyanate compound and a polyol compound is preferred, and a compound selected from a block polyisocyanate compound and a polyol compound is more preferred.

Examples of the polyisocyanate compound include an aliphatic polyisocyanate, an aromatic polyisocyanate and an alicyclic polyisocyanate. Examples of the aliphatic polyisocyanate include tetramethylene diisocyanate, hexamethylene diisocyanate, methylene diisocyanate and trimethylhexamethylene diisocyanate. Examples of the aromatic polyisocyanate include 4,4-diphenylmethane diisocyanate, 2,4-tolylene diisocyanate, 2,6-tolylene diisocyanate, naphthalene-1,5-diisocyanate, o-xylylene diisocyanate, m-xylylene diisocyanate and a 24-tolylene dimer. Examples of the alicyclic polyisocyanate include bicycloheptane triisocyanate, 4,4-methylene bis(cyclohexylisocyanate) and isophorone diisocyanate. These polyisocyanate compounds may be used singly, or two or more of them may be used in combination if required.

The block polyisocyanate compound is a compound having multiple blocked isocyanate groups each of which is produced by protecting an isocyanate group through the reaction with a blocking agent and is temporality inactivated. The blocking agent can be dissociated by heating to a predetermined temperature. As the block polyisocyanate compound, an addition reaction product of a polyisocyanate compound with the blocking agent can be used. The polyisocyanate compound capable of reacting with the blocking agent includes an isocyanurate form, a biuret form and an adduct form thereof. Examples of these types of polyisocyanate compounds are those compounds which are exemplified as the polyisocyanate compound. If required, two or more of these block polyisocyanate compounds may be used in combination.

Examples of the blocking agent include: a phenol-type blocking agent such as phenol, cresol, xylenol, chlorophenol and ethylphenol; a lactam-type blocking agent such as ε-caprolactam, δ-valerolactam, γ-butyrolactam and β-propiolactam; an active methylene-type blocking agent such as ethyl acetoacetate and acetylacetone; an alcohol-type blocking agent such as methanol, ethanol, propanol, butanol, amyl alcohol, ethylene glycol monomethyl ether, ethylene glycol monoethyl ether, ethylene glycol monobutyl ether, diethylene glycol monomethyl ether, propylene glycol monomethyl ether, benzyl ether, methyl glycolate, butyl glycolate, diacetone alcohol, methyl lactate and ethyl lactate; an oxime-type blocking agent such as formaldehydoxime, acetaldoxime, acetoxime, methyl ethyl ketoxime, diacetyl monooxime and cyclohexanone oxime; a mercaptan-type blocking agent such as butyl mercaptan, hexyl mercaptan, t-butyl mercaptan, thiophenol, methylthiophenol and ethylthiophenol; an acid amide-type blocking agent such as acetamide and benzamide; an imide-type blocking agent such as succinic acid imide and maleic acid imide; an amine-type blocking agent such as xylidine, aniline, butylamine and dibutylamine; an imidazole-type blocking agent such as imidazole and 2-ethylimidazole; and an imine-type blocking agent such as methyleneimine and propyleneimine. These blocking agent may be used singly, or two or more of them may be used in combination.

As the block polyisocyanate compound, a commercially available product may be used. Examples of the commercially available product include "Sumidur (a registered trademark)" BL-3175, BL-4165, BL-1100 and BL-1265, "Desmodur (a registered trademark)" TPLS-2957, TPLS-2062, TPLS-2078 and TPLS-2117, and Desmotherm 2170 and 2265 (manufactured by Sumitomo Bayer Urethane Co., Ltd.), "Coronate (a registered trademark)" 2512, 2513 and 2520 (manufactured by Nippon Polyurethane Industry Co., Ltd.), B-830, B-815, B-846, B-870, B-874 and B-882 (manufactured by Mitsui Takeda Chemicals, Inc.), and TPA-B80E, 17B-60PX and E402-B8OT (manufactured by Asahi Kasei Chemicals Corporation).

Examples of the polyol compound include polyester polyol, polyester amide polyol, polyether polyol, polyether ester polyol, polycarbonate polyol and polyolefin polyol. These polyol compounds may be used singly, or two or more of them may be used in combination.

Examples of the polycarboxylic acid compound include an aromatic polycarboxylic acid and an aliphatic polycarboxylic acid. These polycarboxylic acid compounds may be used singly, or two or more of them may be used in combination.

In the present invention, there are a case in which the epoxy resin composition does not contain the crosslinking agent (C) and a case in which the epoxy resin composition contains the crosslinking agent (C).

In the case in which the crosslinking agent (C) is not contained, the content ratio of the polyrotaxane (B) is preferably 1% by mass or more and less than 50% by mass relative to the whole amount of the epoxy resin composition. This content ratio is more preferably 2% by mass or more. This content ratio is more preferably less than 20% by mass. When the content ratio of the polyrotaxane (B) is 1% by mass or more, a phase-separated structure that serves the purpose of improving toughness can be formed easily and the relaxation effect of the polyrotaxane can be exerted easily. When the content ratio of the polyrotaxane (B) is less than 50% by mass, the heat resistance and rigidity of the resin cured product that is obtained after curing can be exerted easily. Both of heat resistance and toughness can be achieved by adjusting the content ratio of the polyrotaxane (B) to a value falling within the above-mentioned range.

In the case in which the epoxy resin composition contains the crosslinking agent (C), the total content ratio of the polyrotaxane (B) and the crosslinking agent (C) is preferably 1% by mass or more and less than 50% by mass relative to the whole amount of the epoxy resin composition. This total content ratio is more preferably 2% by mass or more. This total content ratio is more preferably less than 20% by mass. When this total content ratio is 1% by mass or more, a phase-separated structure that serves the purpose of improving toughness can be formed easily and the relaxation effect of the polyrotaxane and/or a crosslinked product thereof can be exerted easily after the curing of the epoxy resin composition. When this total content ratio is less than 50% by mass, the heat resistance and rigidity of the resin cured product that is obtained after curing can be exerted easily. Both of heat resistance and toughness can be achieved by adjusting the total content ratio of the polyrotaxane (B) and the crosslinking agent (C) to a value falling within the above-mentioned range.

The ratio of the polyrotaxane (B) relative to the total amount of the polyrotaxane (B) and the crosslinking agent (C) is preferably 20% by mass or more, more preferably 30% by mass or more. The ratio of the polyrotaxane (B) relative to the total amount of the polyrotaxane (B) and the crosslinking agent (C) is preferably less than 90% by mass, more preferably less than 70% by mass. If the ratio of the polyrotaxane (B) relative to the total amount of the polyrotaxane (B) and the crosslinking agent (C) is less than 20% by mass or is 90% by mass or more, the polyrotaxane (B) may not react with the crosslinking agent (C) efficiently and therefore heat resistance and toughness may not be achieved together.

Examples of commercially available products of the polyrotaxane (B) include "SeRM (a registered trademark)" Super Polymer SH3400P, SH2400P and SH1310P (manufactured by Advanced Softmaterials Inc.). Examples of commercially available products of a mixture of the polyrotaxane (B) and the crosslinking agent (C) include "SeRM (a registered trademark)" Elastomer S1000 and M1000 (manufactured by Advanced Softmaterials Inc.).

The curing agent (D) is not limited particularly, as long as the curing agent (D) can react with the epoxy resin (A). An amine-type curing agent is used preferably. Examples of this type of curing agent include tetramethylguanidine, imidazole or a derivative thereof, a carboxylic acid hydrazide, a tertiary amine, an aromatic amine, an aliphatic amine and dicyandiamide or a derivative thereof.

Examples of the imidazole derivative include 2-methylimidazole, 1-benzyl-2-methylimidazole and 2-ethyl-4-methylimidazole. Examples of the carboxylic acid hydrazide derivative include adipic acid hydrazide and naphthalenecarboxylic acid hydrazide. Examples of the tertiary amine include N,N-dimethylaniline, N,N-dimethylbenzylamine and 2,4,6-tris(dimethylaminomethyl)phenol. Examples of the aromatic amine include 4,4'-diaminodiphenylmethane, 4,4'-diaminodiphenylsulfone, 3,3'-diaminodiphenylsulfone, m-phenylenediamine, m-xylylenediamine and diethyl toluenediamine. Examples of the aliphatic amine include diethylenetriamine, triethylenetetramine, isophoronediamine, bis(aminomethyl)norbornane, bis(4-aminocyclohexyl)methane and a dimer acid ester of polyethyleneimine. In addition, a modified amine produced by reacting an amine having an active hydrogen atom, such as an aromatic amine and an aliphatic amine, with a compound, such as an epoxy compound, acrylonitrile, phenol and formaldehyde, and thiourea, can also be included.

As the curing agent (D), a latent curing agent that can impart excellent storage stability to the resin composition can also be used preferably. The term "latent curing agent" refers to a curing agent which can exert the activity thereof through the phase change, chemical change or the like caused by the application of a specific stimulus such as heat and light. Examples of the latent curing agent include an amine adduct-type latent curing agent, a microcapsule-type latent curing agent, and dicyandiamide or a derivative thereof.

Examples of commercially available products of the amine adduct-type latent curing agent include "AJICURE (a registered trademark)" PN-23, PN-H, PN-40, PN-50, PN-F, MY-24 and MY-H (manufactured by Ajinomoto Fine-Techno Co., Inc.), and "ADEKA HARDENER (a registered trademark)" EH-3293S, EH-3615S and EH-4070S (manufactured by ADEKA CORPORATION). As the commercially available products of the microcapsule-type latent curing agent, "Novacure (a registered trademark)" HX-3721 and HX-3722 (manufactured by Asahi Kasei Chemicals Corporation) and the like can be used. Examples of commercially available products of dicyandiamide include DICY-7 and DICY-15 (manufactured by Mitsubishi Chemical Corporation). These amine-type curing agents may be used singly, or two or more of them may be used in combination.

As for the curing agent (D), a latent curing agent, such as dicyandiamide or a derivative thereof, is particularly preferably used.

When dicyandiamide is used as the curing agent (D), dicyandiamide may be used alone, or may be used in combination with a curing accelerator or other curing agent. Examples of the curing accelerator to be used in combination with dicyandiamide include a urea compound, an imidazole compound and a Lewis acid catalyst. Examples of the above-mentioned other epoxy resin curing agent include an aromatic amine curing agent, an alicyclic amine curing agent and an acid anhydride curing agent. Examples of commercially available products of the urea compound include DCMU99 (manufactured by Hodogaya Chemical Co., Ltd.), and "Omicure (a registered trademark)" 24, Omicure (a registered trademark) 52 and Omicure (a registered trademark) 94 (manufactured by CVC Specialty Chemicals, Inc.). Examples of commercially available products of the imidazole compound include 2MZ, 2PZ and 2E4MZ (manufactured by Shikoku Chemicals Corporation). As the Lewis acid catalyst, a complex of a boron halide with a base, such as a boron trifluoride-piperidine complex, a boron trifluoride-monoethylamine complex, a boron trifluoride-triethanolamine complex and a boron trichloride-octylamine complex, can be mentioned. From the viewpoint of the storage stability and latent performance, it is preferred to use the urea compound as the curing accelerator for dicyandiamide.

When dicyandiamide is used as the curing agent (D), the content ratio of dicyandiamide is such an amount that the amount of active hydrogen atoms becomes preferably 0.5 to 1.2 times, more preferably 0.7 to 1.1 times, the amount of epoxy groups in the epoxy resin (A), from the viewpoint of heat resistance and mechanical properties. If the amount of active hydrogen atoms is less than 0.5 times, the crosslinking density in the cured product is decreased and therefore the elastic modulus and heat resistance are deteriorated and the static strength properties of the fiber-reinforced composite material are also deteriorated. If the amount of active hydrogen atoms is more than 1.2 times, the crosslinking density in the cured product is increased and therefore the plastic deformation ability may be deteriorated and the impact resistance may become poor.

When the epoxy resin composition does not contain the crosslinking agent (C), it is preferred that the epoxy resin (A) and the polyrotaxane (B) are miscible before curing and both of these components form a phase-separated structure in the resin cured product that is obtained after curing. When the epoxy resin composition contains the crosslinking agent (C), it is preferred that the epoxy resin (A), the polyrotaxane (B) and the crosslinking agent (C) are miscible before curing and all of these components form a phase-separated structure in the resin cured product that is obtained after curing. The determination on whether or not the components are miscible can be carried out with an electron microscope or a differential scanning calorimeter, or by small-angle X-ray scattering or other various methods, as described in, for example, Polymer Alloys and Blends, Leszek A Utracki, Hanser Publishers, P. 64.

In order to confirm the miscible state of the epoxy resin composition before curing, it is preferred to carry out the measurement using an optical microscope or a small-angle X-ray scattering device. In this case, when a phase-separated structure is observed by optical microscopic observation or when the occurrence of scattering coming from a phase-separated structure is detected in an X-ray scattering measurement, it is determined that a phase-separated structure is present. When a phase-separated structure is not observed by optical microscopic observation and when the occurrence of scattering coming from a phase-separated structure is not detected in an X-ray scattering measurement, it is determined that a phase-separated structure is absent.

In order to confirm the miscible state of the epoxy resin composition after curing, it is preferred to carry out the measurement using a transmission electron microscope. In this case, when both of the sizes of phases respectively containing different two resin components as main components are less than 0.001 µm or when no phase-separated structure is formed, it is determined that a phase-separated structure is absent. When phases respectively containing different two resin components as main components form phase structures each having a size of 0.001 µm or more, it is determined that a phase-separated structure is present. The details on the measurement method are as mentioned below.

The confirmation on whether or not the epoxy resin composition forms a phase-separated structure after curing can be made by heating the epoxy resin composition from 50° C. to 135° C. at a temperature rising rate of 2° C./min. and then further heating the epoxy resin composition at 135° C. for two hours to cure the epoxy resin composition and then observing the cured product of the epoxy resin composition in the above-mentioned manner.

It is preferred that the epoxy resin composition according to the present invention is in a miscible state before curing and forms a phase-separated structure through spinodal decomposition during the curing reaction, because a uniform and fine phase-separated structure can be formed throughout the system. When such a phase-separated structure is formed, a cured product of the epoxy resin composition which has high toughness can be produced without deteriorating the rigidity of the epoxy resin. In this case, the curing reaction of the epoxy resin composition which is not cured yet can be initiated by heating or the like. During the reaction, the entropy of the system in association with the increase in the molecular weight decreases with the progression of the curing of the epoxy resin (A), and the phase separation into two phases, i.e., a phase in which a cured product of the epoxy resin is contained as the main component and a phase in which the polyrotaxane or a crosslinked product of the polyrotaxane is contained as the main component, occurs. The wording "contained as the main component" as used herein refers to a matter that the component is contained in an amount of 80% by mass or more in the phase. In this case, a phase in which a cured product of the epoxy resin is contained as the main component contains a portion of the polyrotaxane or a crosslinked product of the polyrotaxane, and a phase in which the polyrotaxane or a crosslinked product of the polyrotaxane is contained as the main component contains a portion of a cured product of the epoxy resin.

It is known that the physical properties of the epoxy resin composition is greatly affected by the phase-separated structure and the size of the phase-separated structure, as well as the components of the epoxy resin composition. A composition which is composed of at least two components and has a phase-separated structure can exhibit superior properties compared with resins each composed of a sole component, because the advantageous property of a resin that is one of raw materials of the composition can be brought out and the disadvantageous property of the resin can be compensated by other components. Phase-separated structures are roughly classified into an islands-in-sea structure and a bicontinuous structure. The term "islands-in-sea structure" refers to a structure in which island structures are scattered in a sea structure. The term "bicontinuous structure" refers to a structure in which at least two components to be mixed form continuous phases separately and the continuous phases are three-dimensionally intertwined with each other.

It is preferred that the phase-separated structure forms an islands-in-sea structure. When the phase-separated structure forms an islands-in-sea structure, such an effect that the propagation of cracking upon breakage can be prevented and toughness can be improved can be achieved. In the islands-in-sea structure, the diameter of each of the island structures is preferably 0.01 µm or more, more preferably 0.05 µm or more. If the diameter of each of the island structures is less than 0.01 µm, the state of the phase-separated structure comes close to a miscible state and therefore the properties of both of the components may not be exerted sufficiently. The diameter of each of the island structures is preferably 10 µm or less, more preferably 1 µm or less, still more preferably 0.5 µm or less, particularly preferably 0.1 µm or less. If the diameter of each of the island structures is more than 10 µm, a cured product of the epoxy resin and a crosslinked product of the polyrotaxane just exert their physical properties separately and it is often difficult to make up for each other's disadvantages.

When the phase-separated structure forms an islands-in-sea structure, it is preferred that each of the island structures is a phase in which the polyrotaxane or a crosslinked product of the polyrotaxane is contained as the main component. When the phase in which the polyrotaxane or a crosslinked product of the polyrotaxane is contained as the main component forms the island structures, the propagation of cracking can be distributed easily by the phase in which the polyrotaxane or a crosslinked product of the polyrotaxane is contained as the main component upon the breakage of the resin composition, and therefore toughness is likely to be improved. Furthermore, in this case, because the sea structure is a phase in which a cured product of the epoxy resin is contained as the main component, rigidity can be maintained. Still further, because a portion of the polyrotaxane or a crosslinked product of the polyrotaxane is contained in the sea structure and this component has an effect of extending the relaxation effect of the polyrotaxane or a crosslinked product of the polyrotaxane to a cured product of the epoxy resin, toughness is more likely to be improved.

When the phase-separated structure forms a bicontinuous structure, the periodic structural dimension is preferably 0.01 µm or more, more preferably 0.05 µm or more. If the periodic structural dimension is less than 0.01 µm, the state of the phase-separated structure comes close to a miscible state and therefore the properties of both of the components may not be exerted sufficiently. The periodic structural dimension is also preferably 10 µm or less, more preferably 1 µm or less, still more preferably 0.5 µm or less, particularly preferably 0.1 µm or less. If the periodic structural dimension is more than 10 µm, a cured product of the epoxy resin and a crosslinked product of the polyrotaxane merely exert their physical properties separately and it is often difficult to make up for each other's disadvantages.

The diameter of each of the island structures in the islands-in-sea structure and the periodic structural dimension of the bicontinuous structure can be determined by, for example, observing with an electron microscope in the following manner.

For the determination of the diameter of each of the island structures in the islands-in-sea structure, at first the magnification of an electron microscope is adjusted in such a manner that 50 or more and less than 100 island structures are present in a square-shaped electron microscopic observation image. Fifty island structures are selected randomly from among the island structures in the observation image at the above-mentioned magnification, and then the longer diameter and the shorter diameter of each of the island structures are measured. The average value of the longer diameter and the shorter diameter is defined as the diameter of the island structure. The average value of the diameters measured for all of the island structures is defined as the diameter of the island structures. The terms "longer diameter" and "shorter diameter" of each of the island structures refer to the longest diameter and the shortest diameter of the island structure, respectively.

For the determination of the periodic structural dimension of a bicontinuous structure, at first the observation magnification is adjusted in such a manner that, when ten straight lines are drawn randomly on a square-shaped electron microscopic observation image, each of the straight lines can intersect 20 or more and less than 200 two-phase boundaries. At the above-mentioned magnification, the value of the length of a line segment lying between both ends of each of the straight lines that are randomly drawn in the observation image is divided by a numerical value obtained by dividing the number of the boundaries by two, thereby obtaining a value for the periodic structural dimension on that straight line. The same procedure is carried out on the ten straight lines. These procedures are carried out on ten sections randomly selected on a specimen of the electron microscopic observation image. The average value of the periodic structural dimensions measured on all of the straight lines is defined as the periodic structural dimension of the bicontinuous structure.

The term "length of a line segment" as used herein refers to an actual length of the line segment, and the actual length can be determined with a scale bar in the observation image.

The epoxy resin composition can contain a thermoplastic resin soluble in the epoxy resin, organic particles such as rubber particles and thermoplastic resin particles, inorganic particles and the like, as long as the object of the present invention cannot be impaired.

The epoxy resin composition can also contain other various additives, as long as the object of the present invention cannot be impaired. Examples of the above-mentioned other various additives include: a reinforcing material or a non-plate-like filler, such as talc, kaolin, mica, clay, bentonite, sericite, basic magnesium carbonate, aluminum hydroxide, glass flakes, glass fibers, carbon fibers, asbestos fibers, rock wool, calcium carbonate, silica sand, wollastonite, barium sulfate, glass beads and titanium oxide; and an antioxidant (a phosphorous-based type, a sulfur-based type, etc.), an ultraviolet ray absorber, a thermal stabilizer (a hindered phenol-type, etc.), a lubricant, a mold release agent, an antistatic agent, an anti-blocking agent, a coloring agent including a dye and a pigment, a flame retardant (a halogen-based type, a phosphorus-based type, etc.), a flame-retardant aid (an antimony compound typified by antimony trioxide, zirconium oxide, molybdenum oxide, etc.), a foaming agent, a coupling agent (e.g., a silane coupling agent and a titanium coupling agent each containing at least one group selected from a glycidyl group, an amino group, a mercapto group, a vinyl group and an isocyanate group) and an antibacterial agent.

A fiber-reinforced composite material comprising a cured product of the epoxy resin composition according to the present invention and reinforcing fibers can be produced by integrally combining the epoxy resin composition according to the present invention with the reinforcing fibers and then curing the resultant product. The cured product of the epoxy resin composition according to the present invention serves as a matrix resin.

In the production of the fiber-reinforced composite material, it is preferred that the reinforcing fibers are impregnated with the epoxy resin composition in advance to produce a prepreg, because the prepreg is easy to store and can be handled easily. The prepreg according to the present invention comprises the epoxy resin composition and reinforcing fibers.

As the method for impregnating a reinforcing fiber base material with the epoxy resin composition, a wet-mode method and a hot-melt method (a dry-mode method) can be mentioned. The wet-mode method is a method in which reinforcing fibers are impregnated with the epoxy resin composition by immersing the reinforcing fibers a solution that is prepared by dissolving the epoxy resin composition in a solvent such as methyl ethyl ketone and methanol, then drawing up the reinforcing fibers, and then evaporating the solvent from the reinforcing fibers with an oven or the like. The hot-melt method is a method in which reinforcing fibers are directly impregnated with the epoxy resin composition which is made lowly viscous by heating or a method in which reinforcing fibers are impregnated with the resin by producing a film comprising mold release paper or the like and the epoxy resin composition coated on the mold release paper or the like in advance, then overlaying the film on both sides or one side of the reinforcing fibers, and then applying pressure onto the resultant product while heating.

The method for producing the fiber-reinforced composite material according to the present invention is not limited particularly, and the fiber-reinforced composite material can be produced by a prepreg lamination molding method, a resin transfer molding method, a resin film infusion method, a hand lay-up method, a sheet molding compounding method, a filament winding method, a protrusion method or the like.

The reinforcing fibers are not limited particularly, and glass fibers, carbon fibers, aramid fibers, boron fibers, alumina fibers, silicon carbide fibers and the like are used. Two or more types of these fibers may be used in the form of a mixture. Among these types of fibers, carbon fibers are preferred, because a light-weight and highly rigid fiber-reinforced composite material can be produced.

The form of the reinforcing fibers is not limited particularly. For example, long fibers which are arranged in one direction, a tow, a woven fabric, a mat, a knit, a braided cord, and a non-woven fabric made from cut fibers can be used. Particularly for the use applications for which high specific strength and a high specific elastic modulus are required, a structure formed from uni-directionally arranged reinforcing fibers bundles is most preferably employed.

The fiber-reinforced composite material according to the present invention are used suitably in sports applications, general industrial applications and aerospace applications. More specifically, in sports applications, the fiber-reinforced composite material are used suitably for golf shafts, fishing rods, badminton and tennis rackets, sticks for hockey or the like and ski poles. In general industrial applications, the fiber-reinforced composite material are used suitably for structural materials for moving vehicles such as cars, bicycles, ships and railway cars, drive shafts, plate springs, windmill blades, pressure containers, flywheels, paper-making rollers, roof materials, cables, repairing/reinforcing materials and the like.

EXAMPLES

Hereinbelow, the epoxy resin composition according to the present invention will be described in more detail by way of examples. For the production of epoxy resin compositions of the examples, the following resin raw materials were used.

<Epoxy Resin>
Bisphenol A-type epoxy resin (YD-128, manufactured by Nippon Steel & Sumikin Chemical Co., Ltd.)
Bisphenol A-type epoxy resin ("Epikote (a registered trademark)" 1004, manufactured by Mitsubishi Chemical Corporation)
Biphenyl-type epoxy resin (YX-4000, manufactured by Mitsubishi Chemical Corporation)
<Curing Agent>
Dicyandiamide (DICY7, manufactured by Mitsubishi Chemical Corporation)
<Curing Accelerator>
3-(3,4-Dichloro phenyl)-1,1-dimethylurea (DCMU99, (manufactured by Hodogaya Chemical Co., Ltd.)

<Polyrotaxanes>
PRX1 (produced by the following method)
α-Cyclodextrin (1.0 g) and amino-terminal polyethylene glycol having an average molecular weight of 20,000 (4.0 g) were dissolved in distilled water at 80° C. and then the resultant solution was stirred to produce an aqueous solution. The aqueous solution was allowed to stand in a refrigerator overnight to produce a milky solution, and then water was removed from the milky solution by lyophilization to produce a while solid. To the white solid were added diisopropylethylamine (0.7 ml), adamantaneacetic acid (0.85 g), 1-hydroxybenzotriazole (0.6 g), benzotriazol-1-yloxytris(dimethylamino)phosphonium hexafluorophosphate (1.8 g) and dimethylformamide (30 ml). The resultant mixture was allowed to react at 5° C. for 24 hours while being purged with nitrogen. Methanol (20 ml) was added to the solution, and the resultant solution was subjected to centrifugation. Furthermore, a washing and centrifugation procedure with a mixed solvent of methanol:dimethylformamide (=20 ml:20 ml) was carried out two rounds, then a washing and centrifugation procedure with methanol (60 ml) was carried out two rounds, and then the resultant product was dried in vacuo. A solid material thus produced was dissolved in dimethyl sulfoxide (20 ml), then the resultant solution was added dropwise in water (200 ml) to generate precipitates, then the solution was subjected to centrifugation, and then a supernatant was discarded. The resultant product was subjected to a washing and centrifugation procedure with water (100 ml) and then with methanol (100 ml), and then the resultant product was dried in vacuo to produce a polyrotaxane of which both terminals were capped with adamantane groups.
"SeRM (a registered trademark)" Super Polymer SH3400P (manufactured by Advanced Softmaterials Inc.)
"SeRM (a registered trademark)" Super Polymer SH2400P (manufactured by Advanced Softmaterials Inc.)
"SeRM (a registered trademark)" Super Polymer SH1310P (manufactured by Advanced Softmaterials Inc.) (These "SeRM (a registered trademark)" Super Polymer series products are polyrotaxanes, in each of which the cyclic molecule is α-cyclodextrin, the linear molecule is polyethylene glycol and the block group is an adamantane group. The cyclic molecule is modified with a graft chain composed of poly(ε-caprolactone).)
<Mixtures of Polyrotaxane and Crosslinking Agent>
"SeRM (a registered trademark)" Elastomer S-1000 (manufactured by Advanced Softmaterials Inc.)
"SeRM (a registered trademark)" Elastomer M-1000 (manufactured by Advanced Softmaterials Inc.) (These "SeRM (a registered trademark)" elastomer series products are mixtures of polyrotaxane and crosslinking agent, in each of which the cyclic molecule is α-cyclodextrin, the linear molecule is polyethylene glycol and the block group is an adamantane group in the polyrotaxane. The cyclic molecule is modified with a graft chain composed of poly(ε-caprolactone). The crosslinking agent contains a polyisocyanate compound and a polyol compound.)
<Block Copolymer>
"Nanostrength (a registered trademark)" M22N (an acrylic block copolymer, manufactured by Arkema Inc.)

The preparation of resin compositions, the production of fiber-reinforced composite materials and the measurement of various physical properties were carried out in the following manner. With respect to the measurement of the physical properties, the measurement was carried out under the condition of a temperature of 23° C. and a relative humidity of 50%, unless otherwise specified.

<Production and Evaluation of Epoxy Resin Composition and Cured Product>
(1) Production of Epoxy Resin Composition and Cured Product Thereof Epoxy resins were mixed well while stirring to produce a homogeneous mixture, and then a polyrotaxane was added thereto. The resultant mixture was further mixed while more fully stirring to produce a homogeneous solution, then dicyandiamide was added as a curing agent to the solution in such a manner that the amount of active hydrogen atoms in the curing agent became 0.8 times the amount of epoxy groups in the epoxy resins, then 3-(3,4-dichlorophenyl)-1,1-dimethylurea was further added as a curing accelerator to the solution, and then the resultant solution was stirred until the powdery substances became adequately homogeneous in the solution. In this manner, an epoxy resin composition was produced.

The epoxy resin composition was injected into a mold of which the thickness was adjusted with a "Teflon (a registered trademark)" spacer having a predetermined thickness, then was heated from 50° C. to 135° C. at a temperature rising rate of 2° C./min. in a hot air oven and then further heated at 135° C. for 2 hours to produce a plate-like cured product.

(2) Confirmation of Miscible State of Resin Composition

During the production of an epoxy resin composition, a portion of a mixture produced by agitating a mixture of epoxy resins and a polyrotaxane was sampled, and the portion was subjected to measurements with an optical microscope at an observation magnification of 50 times and a small-angle X-ray scattering device (SAXSess MC2) to confirm the miscible state of the epoxy resin composition by both the observation with naked eyes and the X-ray scattering measurement. When a phase-separated structure was observed by the optical microscopic observation or when the occurrence of scattering coming from a phase-separated structure was detected by the X-ray scattering measurement, it was determined that a phase-separated structure was present. When a phase-separated structure was not observed by the optical microscopic observation and when the occurrence of scattering coming from a phase-separated structure was not detected by the X-ray scattering measurement, it was determined that a phase-separated structure was absent.

(3) Observation of Cured Product with Electron Microscope (Confirmation of Presence or Absence of Phase-Separated Structure and Measurement of Diameters of Island Structures After Curing)

A resin cured product produced was stained with $OsO_4$ so as to ensure a homologically sufficient degree of contrast and then sliced into a thin specimen, and the specimen was observed with an H-7100 transmission electron microscope (manufactured by Hitachi Ltd.) at an observation magnification of 50000 times and an accelerating voltage of 100 kV. When a phase-separated structure was observed, a transmission electron image was obtained in the following manner and then the diameters of island structures were determined. That is, the magnification was adjusted properly in such a manner that 50 or more and less than 100 island structures were present in a square-shaped electron microscopic observation image. At the magnification, 50 island structures were randomly selected among from the island structures present in the observation image. Subsequently, a longer diameter and a shorter diameter were measured on each of the island structures. The average value of the longer diameter and the shorter diameter was defined as the diameter of the island structure, and the average value of the diameters of all of the island structures measured was defined as the diameter of the island structures. It was determined that the resin cured product was in a miscible state when the size of the phase-separated structure was less than 0.001 μm or no phase-separated structure was formed, and it was determined that the resin cured product was in a phase-separated state when a phase-separated structure having a size of 0.001 μm or more was formed.

(4) Measurement of Bending Elastic Modulus and Bending Elongation at Break of Cured Product An epoxy resin composition was cured in a mold of which the thickness was adjusted to 2 mm with a "Teflon (a registered trademark)" spacer having a thickness of 2 mm to produce a resin cured product having a thickness of 2 mm. The resin cured product was cut into a specimen having a width of 10 mm and a length of 60 mm, and the specimen was subjected to a three-point bending measurement in accordance with JIS K7171 (2008) using an Instron universal testing machine and a load cell having a maximum volume of 5 kN at a span length of 32 mm and a crosshead speed of 100 mm/min to obtain a bending elastic modulus and an amount of flexural deflection. The number of samples was five (n=5), and the average value of the bending elastic moduli measured for the samples and the average value of the amounts of flexural deflection measured for the samples were used for comparison.

(5) Measurement of Toughness of Resin Cured Product

An epoxy resin composition was cured in a mold of which the thickness was adjusted to 6 mm with a "Teflon (a registered trademark)" spacer having a thickness of 6 mm to produce a resin cured product having a thickness of 6 mm. The resin cured product was cut into a specimen having a size of 12.7×150 mm. The specimen was processed and measured in accordance with ASTM D5045 (1999) using an Instron universal testing machine (manufactured by Instron Company). The number of samples was five (n=5), and the average value of the values measured for the samples was used for comparison. In this test, the introduction of initial pre-cracking into the specimen was carried out by putting a blade of a razor, which had been cooled to a temperature of liquid nitrogen, on the specimen and then applying impact to the razor with a hammer. The term "resin toughness value" as used herein refers to a critical stress intensity for deformation mode 1 (opening mode).

(6) Compression Test on Resin Cured Product

An epoxy resin composition was cured in a mold of which the thickness was adjusted to 6 mm with a "Teflon (a registered trademark)" spacer having a thickness of 6 mm to produce a resin cured product having a thickness of 6 mm. A cubic specimen 6 mm on each edge was cut from the plate-like resin cured product, and the specimen was subjected to the measurement of a compressive elastic modulus, a compressive stress at yield, a compressive stress at break and a nominal compressive strain at break under the conditions described in JIS K7181 (2011) except that the test speed was 5 mm/min. The number of samples was five (n=5), and the average values of the compressive moduli of elasticity, the compressive stresses at yield, the compressive stresses at break and the nominal compressive strains at break measured for the samples were determined respectively.

<Production and Evaluation of Fiber-Reinforced Composite Materials>
(7) Production of Uni-Directional Prepregs The epoxy resin compositions which was produced in section (1) and was not cured yet was applied onto a piece of mold release paper with a reverse roll coater. In this manner, resin films were produced. Two plies of the resin films were respectively overlaid on both surfaces of a carbon fiber product "TORAYCA (a registered trademark)" T800H (manufactured by Toray Industries Inc.) in which carbon fibers were arranged in one direction in a sheet-like form, and the resultant product was heated while applying pressure to impregnate the carbon fibers with the resin composition. In this manner, a uni-directional prepreg having a carbon fiber weight of 125 g/m² per unit area and a fiber weight content rate of 75% was produced.

(8) Production of Uni-Directional Laminate Plate of Fiber-Reinforced Composite Material Twenty plies of the uni-directional prepregs produced in section (7) above were laminated together in such a manner that the fibers were arranged in the same direction. The laminated prepregs were wrapped with a nylon film with no gap being left. The resultant product was cured by heating and pressurizing in an autoclave at a temperature of 135° C. and an internal pressure of 588 kPa for two hours to produce a uni-directional laminate plate.

(9) Method for Measuring 0° Bending Strength of Fiber-Reinforced Composite Material As a measure of the bending strength of the fiber-reinforced composite material, 0° bending strength of the uni-directional laminate plate was measured. The uni-directional laminate plate was cut into a specimen having a thickness of 2 mm, a width of 15 mm and a length of 100 mm. The measurement was carried out with an Instron universal testing machine (Instron Corporation) at a crosshead speed of 5.0 mm/min., a span of 80 mm, an indenter diameter of 10 mm and a fulcrum diameter of 4 mm to determine 0° bending strength and bending elongation at break. The real Vf (carbon fiber volume fraction) was determined on the basis of the areal fiber weight of the produced prepreg, and then the bending strength and the bending elongation at break were respectively converted to Vf60% values. The number of samples was five (n=5), and the average value of the values of bending strength and the average value of the values of bending elongation at break all measured for the samples were determined.

(10) 90° Bending Strength of Fiber-Reinforced Composite Material

As a measure of the bonding between an epoxy resin composition and reinforcing fibers, 90° bending strength of a fiber-reinforced composite material was measured. The uni-directional laminate plate was cut into a specimen having a thickness of 2 mm, a width of 15 mm and a length of 60 mm. The measurement was carried out with an Instron universal testing machine (Instron Corporation) at a crosshead speed of 1.0 mm/min., a span of 40 mm, an indenter diameter of 10 mm and a fulcrum diameter of 4 mm to determine 90° bending strength and bending elongation at break. The real Vf was determined on the basis of the areal fiber weight of the produced prepreg, and then the bending strength and the bending elongation at break were respectively converted to Vf60% values. The number of samples was five (n=5), and the average value of the values of bending strength and the average value of the values of bending elongation at break measured for the samples were determined.

(11) Measurement of Interlaminar Toughness (Mode I Interlaminar Toughness) of Fiber-Reinforced Composite Material Production of composite material flat plate for mode I interlaminar toughness ($G_{IC}$) test and measurement of $G_{IC}$ A composite material flat plate for $G_{IC}$ test was produced in accordance with JIS K7086 (1993) by carrying out the procedures (a) to (f) mentioned below.

(a) Twenty plies of the uni-directional prepregs produced in section (7) were laminated together in such a manner that fibers were arranged in the same direction. In the resultant laminate, a resin film having a width of 40 mm was interposed at an angle perpendicular to the fiber arrangement direction between center part layers (i.e., between the $10^{th}$ ply and the $11^{th}$ 1 ply) of the laminate.

(b) The prepreg laminate was wrapped with a nylon film with no gap being left, and then was cured by heating and pressurizing in an autoclave at a temperature of 180° C. and an internal pressure of 0.6 MPa for two hours to form a uni-directional fiber-reinforced composite material.

(c) The uni-directional fiber-reinforced composite material produced in section (b) was cut into a specimen having a width of 20 mm and a length of 195 mm. The cutting was made in such a manner that the direction of fibers became parallel with the length side of the specimen.

(d) A pin loading block (length: 25 mm, made from aluminum) was bonded to one end (the side on which the film was interposed) of the specimen in accordance with JIS K7086 (1993).

(e) The film-interposed part was cleaved with a sharp cutting tool such as a knife to introduce a pre-crack having a length of 2 mm to 5 mm into the specimen.

(f) In order to make it possible to observe the propagation of cracking easily, a white paint was applied on both surfaces of the specimen.

The measurement of $G_{IC}$ was carried out using the produced composite material flat plate in the following manner.

The test was carried out in accordance with JIS K7086 (1993) using an Instron universal testing machine (manufactured by Instron Company). The crosshead speed employed was 0.5 mm/min. until the cracking propagated by 20 mm and was 1 mm/min. thereafter. The $G_{IC}$ was calculated from the load, the amount of displacement and the length of the crack. The number of samples was three (n=3), and the average value of the values measured for the samples was defined as the $G_{IC}$ value.

Examples 1 to 5

The components shown in Table 1 were compounded at compounding ratios shown in Table 1, and cured products of the epoxy resin compositions were produced by the method mentioned in section (1). From the observation with an electron microscope, it was confirmed that each of the resin cured products formed a phase-separated structure having an islands-in-sea structure. Various physical properties were measured, and it was found that all of bending properties, toughness and compressive properties of the produced cured products were good.

Examples 6 to 14

The components shown in Tables 1 and 2 were compounded at compounding ratios shown in Tables 1 and 2 in which a mixture of a polyrotaxane and a crosslinking agent was used in place of a polyrotaxane, and cured products of the epoxy resin compositions were produced by the method mentioned in section (1). From the observation with an electron microscope, it was confirmed that each of the resin cured products formed a phase-separated structure having an islands-in-sea structure. Various physical properties were measured, and it was found that all of bending properties, toughness and compressive properties of the produced cured products were good.

Example 15

The components shown in Table 2 were compounded at a compounding ratio shown in Table 2, and a cured product of the epoxy resin composition was produced by the method mentioned in section (1). From the observation with an electron microscope, it was confirmed that the resin cured product did not form a phase-separated structure and was in a miscible state. Various physical properties were measured, and it was found that both of bending properties and toughness of the produced cured product were good.

Example 16

The components shown in Table 2 were compounded at a compounding ratio shown in Table 2 in which a mixture of a polyrotaxane and a crosslinking agent was used in place of a polyrotaxane, and a cured product of the epoxy resin composition was produced by the method mentioned in section (1). From the observation with an electron microscope, it was confirmed that the resin cured product did not form a phase-separated structure and was in a miscible state. Various physical properties were measured, and it was found that both of bending properties and toughness of the produced cured product were good.

Example 17

The components shown in Table 2 were compounded at a compounding ratio shown in Table 2, and a cured product of the epoxy resin composition was produced by the method mentioned in section (1). From the observation with an electron microscope, it was confirmed that the resin cured product formed a phase-separated structure having an islands-in-sea structure. Various physical properties were measured, and it was found that all of bending properties, toughness and compressive properties of the produced cured product were good. In addition, a uni-directional laminate plate of a fiber-reinforced composite material was also produced by the method mentioned in section (7). The uni-directional laminate plate was subjected to the 0° and 90° bending tests and the $G_{IC}$ test, and it was found that all of bending strength, a bending elongation at break and a $G_{IC}$ value were good.

Example 18

The components shown in Table 2 were compounded at a compounding ratio shown in Table 2 in which a mixture of a polyrotaxane and a crosslinking agent was used, and a cured product of the epoxy resin composition was produced by the method mentioned in section (1). From the observation with an electron microscope, it was confirmed that the resin cured product formed a phase-separated structure having an islands-in-sea structure. Various physical properties were measured, and it was found that all of bending properties, toughness and compressive properties of the produced cured product were good. In addition, a uni-directional laminate plate of a fiber-reinforced composite material was also produced by the method mentioned in section (7). The uni-directional laminate plate was subjected to the 0° and 90° bending tests and the $G_{IC}$ test, and it was found that all of bending strength, a bending elongation at break and a $G_{IC}$ value were good.

Comparative Example 1

The components shown in Table 2 were compounded at a compounding ratio shown in Table 2 in which no polyrotaxane was compounded, and a cured product of the epoxy resin composition was produced by the method mentioned in section (1). From the observation with an electron microscope, it was confirmed that the resin cured product did not form a phase-separated structure and was in a miscible state. Various physical properties were measured, and it was found that all of bending properties, toughness and compressive properties of the produced cured product were poor compared with those of the cured products of Examples 1 to 4 and 6 to 11.

Comparative Example 2

The components shown in Table 2 were compounded at a compounding ratio shown in Table 2 in which no polyrotaxane was compounded, and a cured product of the epoxy resin composition was produced by the method mentioned in section (1). From the observation with an electron microscope, it was confirmed that the resin cured product did not form a phase-separated structure and was in a miscible state. Various physical properties were measured, and it was found that both of bending properties and toughness of the produced cured product were poor compared with those of the cured products of Examples 15 and 16.

Comparative Example 3

The components shown in Table 2 were compounded at a compounding ratio shown in Table 2 in which a polyrotaxane that was not modified with a graft chain was used as a polyrotaxane component, and a cured product of the epoxy resin composition was produced by the method mentioned in section (1). From the observation with an electron microscope, it was confirmed that the resin cured product formed a phase-separated structure having an islands-in-sea structure. Because the cyclodextrin molecule in the polyrotaxane was not modified with a graft chain, the diameter of island structure was more than 10 µm in the phase-separated structure formed in the resin cured product. Various physical properties were measured, and it was found that the balance among bending properties, toughness and compressive properties of the produced cured product was poor compared with those of the cured products of Examples 5, 12 to 14, 17 and 18.

Comparative Example 4

The components shown in Table 2 were compounded at a compounding ratio shown in Table 2 in which no polyrotaxane was compounded, and a cured product of the epoxy resin composition was produced by the method mentioned in section (1). From the observation with an electron microscope, it was confirmed that the resin cured product did not form a phase separated structure and was in a miscible state. Various physical properties were measured, and it was found that the balance among bending properties, toughness and compressive properties of the produced cured product was poor compared with those of the cured products of Examples 5, 12 to 14, 17 and 18. In addition, a uni-directional laminate plate of a fiber-reinforced composite material was also produced by the method mentioned in section (7). The uni-directional laminate plate was subjected to the 0° and 90° bending tests and the $G_{IC}$ test, and it was found that all of bending strength, a bending elongation at break and a $G_{IC}$ value of the uni-directional laminate plate were poor compared with those of the uni-directional laminate plates of Examples 17 and 18.

Comparative Example 5

The components shown in Table 2 were compounded at a compounding ratio shown in Table 2 in which a block copolymer was compounded in place of a polyrotaxane, and a cured product of the epoxy resin composition was produced by the method mentioned in section (1). From the observation with an electron microscope, it was confirmed that the resin cured product formed a phase-separated structure having an islands-in-sea structure. Various physical properties were measured, and it was found that the balance among bending properties, toughness and compressive properties of the produced cured product was poor compared with those of the cured products of Examples 5, 12 to 14 and 17 to 18.

TABLE 1

|  |  | Unit | Example 1 | Example 2 | Example 3 | Example 4 | Example 5 | Example 6 |
|---|---|---|---|---|---|---|---|---|
| Epoxy resin | YD-128 | Part(s) by mass | 92.4 | 88.9 | 85.0 | 81.4 | 51.8 | 88.9 |
|  | Epikote ®1004 | Part(s) by mass |  |  |  |  | 34.6 |  |
|  | YX-4000 | Part(s) by mass |  |  |  |  |  |  |
| Curing agent | DICY7 | Part(s) by mass | 4.7 | 4.5 | 4.3 | 4.1 | 2.9 | 4.5 |
| Polyrotaxane having graft chain | SH3400P | Part(s) by mass | 1.0 | 4.7 | 8.9 |  |  |  |
|  | SH2400P | Part(s) by mass |  |  |  | 12.8 |  |  |
|  | SH1310P | Part(s) by mass |  |  |  |  | 8.9 |  |
| Polyrotaxane having graft chain and polyrotaxane crosslinking agent | S-1000 | Part(s) by mass |  |  |  |  |  | 4.7 |
|  | M-1000 | Part(s) by mass |  |  |  |  |  |  |
| Polyrotaxane | PRX1 | Part(s) by mass |  |  |  |  |  |  |
| Block copolymer | M22N | Part(s) by mass |  |  |  |  |  |  |
| Curing accelerator | DCMU99 | Part(s) by mass | 1.9 | 1.9 | 1.8 | 1.7 | 1.8 | 1.9 |
| Phase-separated structure | Mutually solubilized state of resin composition before curing | — | Mutually solubilized | Mutually solubilized | Mutually solubilized | Mutually solubilized | Mutually solubilized | Mutually solubilized |
|  | Presence or absence of phase-separated structure after curing | — | Present | Present | absent | Present | Present | Present |
|  | Diameters of island structures | μm | 0.18 | 0.25 | 0.29 | 0.32 | 0.28 | 0.12 |
| Bending test | Bending elastic modulus | GPa | 3.2 | 3.0 | 2.9 | 2.8 | 3.7 | 3.6 |
|  | Bending elongation at break | mm | 7.1 | 9.5 | 12.1 | 11.2 | 12.5 | 8.0 |
| Toughness test | Toughness value | MPa·m$^{1/2}$ | 1.01 | 1.28 | 1.37 | 1.38 | 1.42 | 1.10 |
| Compression test | Compressive elastic modulus | GPa | 2.5 | 2.4 | 2.3 | 2.3 | 2.7 | 2.8 |
|  | Compressive stress at yield | MPa | 126 | 131 | 132 | 132 | 166 | 136 |
|  | Compressive stress at break | MPa | 321 | 325 | 328 | 331 | 402 | 328 |
|  | Nominal compressive strain at break | % | 51 | 53 | 53 | 54 | 55 | 54 |

|  |  | Unit | Example 7 | Example 8 | Example 9 | Example 10 | Example 11 |
|---|---|---|---|---|---|---|---|
| Epoxy resin | YD-128 | Part(s) by mass | 85.0 | 81.4 | 88.9 | 85.0 | 79.3 |
|  | Epikote ®1004 | Part(s) by mass |  |  |  |  |  |
|  | YX-4000 | Part(s) by mass |  |  |  |  |  |
| Curing agent | DICY7 | Part(s) by mass | 4.3 | 4.1 | 4.5 | 4.3 | 4.0 |
| Polyrotaxane having graft chain | SH3400P | Part(s) by mass |  |  |  |  |  |
|  | SH2400P | Part(s) by mass |  |  |  |  |  |
|  | SH1310P | Part(s) by mass |  |  |  |  |  |
| Polyrotaxane having graft chain and polyrotaxane crosslinking agent | S-1000 | Part(s) by mass | 8.9 | 12.8 |  |  |  |
|  | M-1000 | Part(s) by mass |  |  | 4.7 | 8.9 | 15.0 |
| Polyrotaxane | PRX1 | Part(s) by mass |  |  |  |  |  |
| Block copolymer | M22N | Part(s) by mass |  |  |  |  |  |
| Curing accelerator | DCMU99 | Part(s) by mass | 1.8 | 1.7 | 1.9 | 1.8 | 1.7 |
| Phase-separated structure | Mutually solubilized state of resin composition before curing | — | Mutually solubilized | Mutually solubilized | Mutually solubilized | Mutually solubilized | Mutually solubilized |
|  | Presence or absence of phase-separated structure after curing | — | Present | Present | Present | Present | Present |
|  | Diameters of island structures | μm | 0.18 | 0.22 | 0.14 | 0.17 | 0.25 |
| Bending test | Bending elastic modulus | GPa | 3.9 | 4.1 | 3.8 | 3.7 | 4.0 |
|  | Bending elongation at break | mm | 9.2 | 9.0 | 15.3 | 8.5 | 8.2 |
| Toughness test | Toughness value | MPa·m$^{1/2}$ | 1.15 | 1.21 | 1.03 | 1.12 | 1.23 |
| Compression test | Compressive elastic modulus | GPa | 3.0 | 3.1 | 2.9 | 2.8 | 3.0 |
|  | Compressive stress at yield | MPa | 134 | 133 | 131 | 131 | 130 |
|  | Compressive stress at break | MPa | 329 | 330 | 325 | 324 | 321 |
|  | Nominal compressive strain at break | % | 55 | 56 | 54 | 56 | 56 |

TABLE 2

|  |  | Unit | Example 12 | Example 13 | Example 14 | Example 15 | Example 16 | Example 17 |
|---|---|---|---|---|---|---|---|---|
| Epoxy resin | YD-128 | Part(s) by mass | 54.2 | 51.8 | 48.3 |  |  | 54.2 |
|  | Epikote ®1004 | Part(s) by mass | 36.2 | 34.6 | 32.3 | 45.4 | 45.4 | 36.2 |
|  | YX-4000 | Part(s) by mass |  |  |  | 45.4 | 45.4 |  |
| Curing agent | DICY7 | Part(s) by mass | 3.0 | 2.9 | 2.7 | 2.7 | 2.7 | 3.0 |
| Polyrotaxane having graft chain | SH3400P | Part(s) by mass |  |  |  |  |  |  |
|  | SH2400P | Part(s) by mass |  |  |  |  | 4.5 | 4.7 |
|  | SH1310P | Part(s) by mass |  |  |  |  |  |  |
| Polyrotaxane having graft chain and polyrotaxane crosslinking agent | S-1000 | Part(s) by mass | 4.7 | 8.9 | 15.0 |  | 4.5 |  |
|  | M-1000 | Part(s) by mass |  |  |  |  |  |  |
| Polyrotaxane | PRX1 | Part(s) by mass |  |  |  |  |  |  |
| Block copolymer | M22N | Part(s) by mass |  |  |  |  |  |  |
| Curing accelerator | DCMU99 | Part(s) by mass | 1.9 | 1.8 | 1.7 | 1.8 | 1.8 | 1.9 |
| Phase-separated structure | Mutually solubilized state of resin composition before curing | — | Mutually solubilized | Mutually solubilized | Mutually solubilized | Mutually solubilized | Mutually solubilized | Mutually solubilized |
|  | Presence or absence of phase-separated structure after curing | — | Present | Present | Present | absent | absent | Present |
|  | Diameters of island structures | μm | 0.15 | 0.19 | 0.26 | — | — | 0.28 |
| Bending test | Bending elastic modulus | GPa | 3.9 | 4.3 | 4.5 | 3.5 | 3.6 | 3.6 |
|  | Bending elongation at break | mm | 12.0 | 12.0 | 10.0 | 11.5 | 12.0 | 10.7 |
| Toughness test | Toughness value | MPa·m$^{1/2}$ | 1.20 | 1.27 | 1.35 | 1.30 | 1.40 | 1.31 |
| Compression test | Compressive elastic modulus | GPa | 2.9 | 3.2 | 3.3 | — | — | 2.8 |
|  | Compressive stress at yield | MPa | 169 | 172 | 173 | — | — | 164 |
|  | Compressive stress at break | MPa | 394 | 394 | 392 | — | — | 399 |
|  | Nominal compressive strain at break | % | 56 | 57 | 55 | — | — | 55 |
| Test for fiber-reinforced composite material | 0° bending strength | MPa |  |  |  |  |  | 1506 |
|  | 90° bending strength | MPa |  |  |  |  |  | 119 |
|  | GIC | J/m$^2$ |  |  |  |  |  | 548 |

|  |  | Unit | Example 18 | Comparative Example 1 | Comparative Example 2 | Comparative Example 3 | Comparative Example 4 | Comparative Example 5 |
|---|---|---|---|---|---|---|---|---|
| Epoxy resin | YD-128 | Part(s) by mass | 54.2 | 93.3 |  | 54.2 | 56.9 | 55.2 |
|  | Epikote ®1004 | Part(s) by mass | 36.2 |  | 47.6 | 36.2 | 37.9 | 36.9 |
|  | YX-4000 | Part(s) by mass |  |  | 47.6 |  |  |  |
| Curing agent | DICY7 | Part(s) by mass | 3.0 | 4.7 | 2.9 | 3.0 | 3.2 | 3.1 |
| Polyrotaxane having graft chain | SH3400P | Part(s) by mass |  |  |  |  |  |  |
|  | SH2400P | Part(s) by mass |  |  |  |  |  |  |
|  | SH1310P | Part(s) by mass |  |  |  |  |  |  |
| Polyrotaxane having graft chain and polyrotaxane crosslinking agent | S-1000 | Part(s) by mass |  |  |  |  |  |  |
|  | M-1000 | Part(s) by mass | 4.7 |  |  |  |  |  |
| Polyrotaxane | PRX1 | Part(s) by mass |  |  |  | 4.7 |  |  |
| Block copolymer | M22N | Part(s) by mass |  |  |  |  |  | 2.9 |
| Curing accelerator | DCMU99 | Part(s) by mass | 1.9 | 2.0 | 1.9 | 1.9 | 2.0 | 1.9 |
| Phase-separated structure | Mutually solubilized state of resin composition before curing | — | Mutually solubilized | Mutually solubilized | Mutually solubilized | Mutually solubilized | Mutually solubilized | Mutually solubilized |
|  | Presence or absence of phase-separated structure after curing | — | Present | absent | absent | Present | absent | Present |
|  | Diameters of island structures | μm | 0.24 | — | — | 10.6 | — | 0.03 |
| Bending test | Bending elastic modulus | GPa | 3.9 | 3.2 | 3.4 | 3.9 | 3.6 | 3.5 |
|  | Bending elongation at break | mm | 12.0 | 5.0 | 12.0 | 10.0 | 7.5 | 8.0 |
| Toughness test | Toughness value | MPa·m$^{1/2}$ | 1.30 | 0.90 | 1.20 | 1.00 | 1.00 | 1.25 |
| Compression test | Compressive elastic modulus | GPa | 2.8 | 2.5 | — | 2.8 | 2.6 | 2.5 |
|  | Compressive stress at yield | MPa | 167 | 127 | — | 158 | 162 | 153 |
|  | Compressive stress at break | MPa | 374 | 320 | — | 397 | 398 | 401 |
|  | Nominal compressive strain at break | % | 56 | 51 | — | 54 | 54 | 54 |
| Test for fiber-reinforced composite material | 0° bending strength | MPa | 1625 |  |  |  | 1320 |  |
|  | 90° bending strength | MPa | 125 |  |  |  | 98 |  |
|  | GIC | J/m$^2$ | 559 |  |  |  | 405 |  |

The invention claimed is:

1. A prepreg comprising an epoxy resin composition and reinforcing fibers, wherein the epoxy resin composition comprises 80% or more by mass of an epoxy resin (A), which is a glycidyl ether-type epoxy resin, a polyrotaxane (B) having graft-chain-modified cyclic molecules, the graft chain of which is an aliphatic polyester, at least one crosslinking agent (C) selected from the group consisting of a polyisocyanate compound and a polyol compound, and capable of reacting with the polyrotaxane, wherein the total content ratio of the polyrotaxane (B) and the at least one crosslinking agent (C) is 1% by mass or more and less than 10% by mass relative to the whole amount of the epoxy resin composition, wherein the ratio of the polyrotaxane (B) relative to the total amount of the polyrotaxane (B) and the at least one crosslinking agent (C) is 20% by mass or more and less than 70% by mass, and a curing agent (D) capable of reacting with the epoxy resin (A), which is an amine-type curing agent; and wherein the reinforcing fibers are carbon fibers which are arranged in one direction.

2. The prepreg according to claim 1, wherein the epoxy resin (A) and the polyrotaxane (B) are miscible, and a resin cured product produced by heating the epoxy resin composition from 50° C. to 135° C. at a temperature rising rate of 2° C./min. and then further heating the epoxy resin composition at 135° C. for two hours forms a phase-separated structure.

3. The prepreg according to claim 2, wherein the phase-separated structure forms an islands-in-sea structure and the islands have a diameter of 0.01 to 10 μm.

4. A fiber-reinforced composite material produced by curing the prepreg according to claim 1.

5. The prepreg according to claim 1, wherein the curing agent is dicyandiamide.

6. The prepreg according to claim 1, wherein the total content ratio of the polyrotaxane (B) and the at least one crosslinking agent (C) is 2% and less than 10% by mass relative to the whole amount the epoxy resin composition or more by mass.

7. The prepreg according to claim 1, wherein the ratio of the polyrotaxane (B) relative to the total amount of the polyrotaxane (B) and the at least one crosslinking agent (C) is 30% by mass or more and less than 70% by mass.

8. The prepreg according to claim 1, wherein the epoxy resin composition comprises 90% or more by mass of the epoxy resin (A).

* * * * *